April 16, 1940.　　　　N. F. AGNEW　　　　2,197,423

BATTERY CHARGING APPARATUS

Filed April 23, 1938

INVENTOR
Norman F. Agnew.
BY
HIS ATTORNEY

Patented Apr. 16, 1940

2,197,423

UNITED STATES PATENT OFFICE 2,197,423

BATTERY CHARGING APPARATUS

Norman F. Agnew, Penn Township, Allegheny County, Pa., assignor to The Union Switch & Signal Company, Swissvale, Pa., a corporation of Pennsylvania Application April 23, 1938, Serial No. 203,910

7 Claims. (Cl. 171—314)

My invention relates to battery charging apparatus of the type wherein provision is made for charging a battery at two different rates, and wherein automatic means is provided for changing from the higher rate to the lower rate when the battery becomes fully charged.

One feature of my invention is the provision, in the apparatus of this character, of novel and improved means for charging a battery at a selected rate until it reaches that voltage at which for the existing ambient temperature it is fully charged, and for then automatically changing the charging rate. Other features and advantages of my invention will appear as the specification progresses.

I shall describe three forms of apparatus embodying my invention, and shall then point out the novel features thereof in claims.

Figure 1:
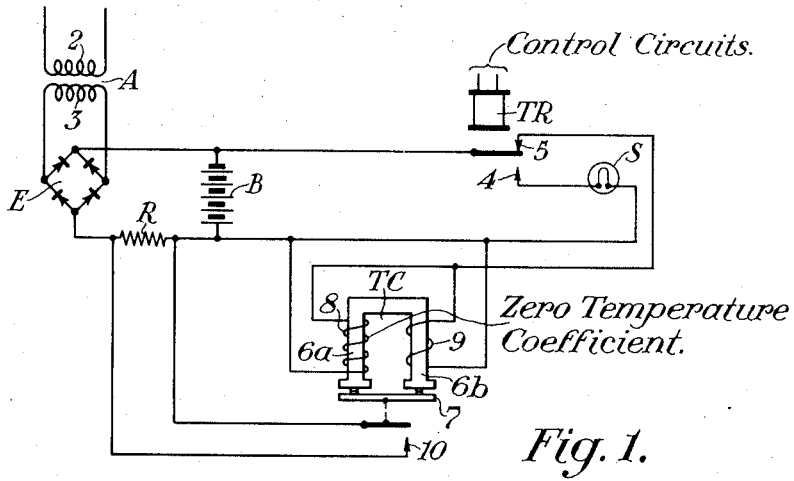
Figure 2:
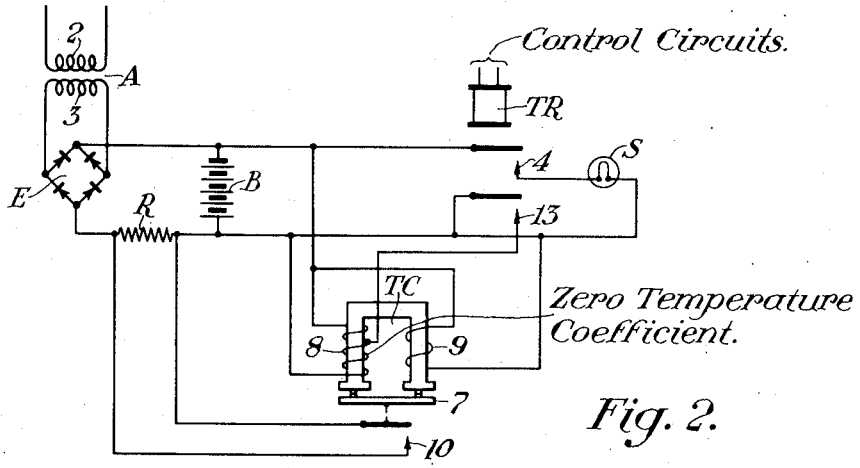
Figure 3:
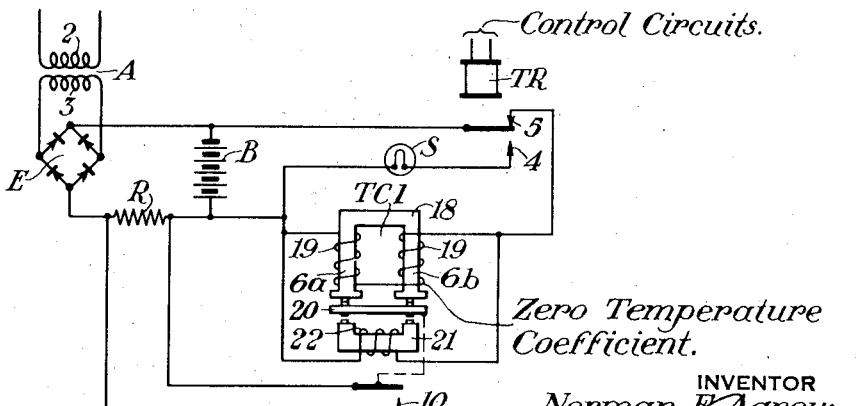

In the accompanying drawing, Fig. 1 is a diagrammatic view showing one form of battery charging apparatus embodying my invention. Figs. 2 and 3 are diagrammatic views showing modifications of the apparatus shown in Fig. 1 and also embodying my invention.

Similar reference characters refer to similar parts in each of the several views.

Referring first to Fig. 1, the reference character A designates a transformer, the primary winding 2 of which is constantly connected with a source of alternating current which is not shown in the drawing. The secondary winding 3 of this transformer is constantly connected with the input terminals of a full wave rectifier E, and the output terminals of this rectifier are constantly connected with the terminals of a battery B through a regulating impedance here shown as a resistance R.

The reference character S designates a load which may, for example, be an electric lamp associated with a railway signal, and which may be energized at such times as a back contact 4 of a relay TR is closed to connect lamp S across the terminals of battery B. Since the specific control of relay TR forms no part of my invention, the control circuit for this relay is not shown in the drawing.

The reference character TC designates a differential relay which is energized when a front contact 5 of relay TR is closed to connect relay TC across the terminals of battery B. As shown here, relay TC comprises a simple magnetic structure provided with the usual cores 6a and 6b and the usual armature 7 cooperating therewith. Core 6a is provided with a first or operating winding 8 of a material having substantially zero temperature coefficient of resistance, and core 6b is provided with a second winding 9 of ordinary copper wire or other suitable material having a positive temperature coefficient of resistance. Windings 8 and 9 are energized in multiple, and winding 9 is arranged so that the magnetic flux created thereby opposes the magnetic flux created by winding 8 in the magnetic circuit of relay TC. These windings may be constructed so that variations in ambient temperature produce corresponding variations in the number of effective ampere turns available to pick up armature 7 for a given voltage applied to the windings. That is to say, winding 8, having substantially a zero temperature coefficient of resistance, provides substantially the same number of ampere turns for a constant voltage through a given range of ambient temperature. However, winding 9, having a positive temperature coefficient of resistance, provides at low temperatures more ampere turns to oppose the ampere turns of winding 8 than it provides at high temperatures for a given voltage applied to the winding. It follows that armature 7 will close on a lower voltage at higher temperatures than at lower temperatures. Relay TC is also provided with a contact 10 which is open when armature 7 is in its attracted or closed position but is closed when the armature is in its released or open position. When contact 10 is closed, it completes a shunt path around resistance R.

It is a well-known characteristic of storage batteries that the voltage of a fully charged battery decreases with an increase in ambient temperature. Since the voltage at which relay TC closes decreases as the ambient temperature increases, and since the fully charged voltage of the battery decreases as the ambient temperature increases, the parts of relay TC may be so proportioned that armature 7 will close when battery B is fully charged regardless of the ambient temperature. For example, a six cell lead storage battery is normally rated fully charged at 13.5 volts at 70 degrees Fahrenheit, at 14.2 volts at 20 degrees Fahrenheit, and at 12.8 volts at 120 degrees Fahrenheit. The parts of relay TC will be arranged and proportioned so that relay TC, for the example chosen, will pick up at 14.2 volts at 20 degrees Fahrenheit, at 13.5 volts at 70 degrees Fahrenheit, and at 12.8 volts at 120 degrees Fahrenheit. It can be seen, therefore, that the voltage at which relay TC will pick up corresponds with the fully charged condition of the battery under all temperature conditions within said given range.

Normally the parts are in the positions shown in Fig. 1. In this condition, relay TR is closed so that lamp S is deenergized and relay TC is energized. Armature 7 is closed so that resistance R is interposed in the charging circuit for battery B with the result that battery B is being charged at its lower rate. This rate is usually substantially that required to maintain an idle battery fully charged. When relay TR releases, lamp S becomes energized and relay TC becomes deenergized to release armature 7. Contact 10 of relay TC then closes thereby closing the shunt path around resistor R so that battery B now is charged at its higher rate. When relay TR becomes energized, relay TC also becomes energized but armature 7 will not pick up until battery B is fully charged. It follows that battery B is charged at a low rate under normal conditions, is charged at a high rate when the load circuit is connected thereto, and this high rate is continued after the load circuit is disconnected until the fully charged voltage of the battery is obtained regardless of the ambient temperature. When the battery is fully charged the apparatus automatically switches the charging circuit to the low rate.

It is obvious that by changing the characteristics and proportions of the windings of relay TC, the pick-up value of this relay can be made to vary in almost any desired manner in direct or inverse proportion to ambient temperature variations. It is also obvious that relay TC can be made to control the charging circuit as desired.

Referring now to Fig. 2, the apparatus is the same as that shown in Fig. 1 except that windings 3 and 9 are constantly connected across battery B and a portion of winding 8 is placed on short circuit when a back contact 13 of relay TR is closed. When relay TR is energized and battery B is fully charged, armature 7 is closed. When relay TR releases, back contact 4 of relay TR closes to close the energizing circuit for lamp S, and back contact 13 of relay TR closes to complete a shunt path around the lower portion of the operating winding 8 of relay TC. This shunt path reduces the effective number of ampere turns created by winding 8 to a value equal to or slightly less than the ampere turns required to retain the armature 7 in its closed position. Relay TC then releases and closes back contact 15 to close the shunt path around resistor R, so that battery B is charged at the higher rate.

Then, when relay TR picks up, back contact 13 of relay TR opens to open the shunt path around the lower portion of winding 8. Windings 8 and 9 will be so arranged and proportioned that relay TC does not pick up until battery B reaches that voltage at which for the existing ambient temperature it is in its fully charged condition.

Referring now to Fig. 3, the charge controlling relay, which is here designated TC1, comprises a magnetic structure having cores 6a and 6b provided with a pick-up winding 19 which may have a zero temperature coefficient of resistance, and a second magnetic structure 21 provided with a hold-down winding 22 which may have a positive temperature coefficient of resistance. Windings 19 and 22 are connected in multiple and are energized by battery B when front contact 5 of relay TR is closed. The relay TC1 is so proportioned and constructed that when its windings 19 and 22 are connected across the battery B in multiple the armature 20 is picked up at the fully charged voltage of the battery regardless of the existing ambient temperature.

Normally front contact 5 of relay TR is closed to connect windings 19 and 22 of relay TC1 across the terminals of battery B, and relay TC1 is picked up. When relay TR releases, relay TC1 likewise releases, and back contact 10 closes to close the shunt path around resistance R so that battery B is charged at its higher rate. Then, when relay TR picks up and closes front contact 5, relay TC1 becomes energized but does not pick up until battery B becomes fully charged. As explained hereinbefore, windings 19 and 22 of relay TC1 are so proportioned that relay TC1 is picked up at the voltage at which for the existing ambient temperature battery B is fully charged.

One advantage of apparatus embodying my invention is the provision of means for charging a storage battery at a high rate until the battery has reached the voltage at which for the existing ambient temperature it is in its fully charged condition, and then to automatically change the rate of charge for the battery.

Although I have herein shown and described only three forms of battery charging apparatus and embodying my invention, it is understood that various changes and modifications may be made therein within the scope of the appended claims without departing from the spirit and scope of my invention.

Having thus described my invention, what I claim is:

1. In combination, a storage battery, charging means operative to charge said battery at either a high rate or at a low rate, a load circuit, a differential relay provided with a first winding having substantially a zero temperature coefficient of resistance and a second winding having a positive temperature coefficient of resistance, said relay adjusted to pick up its armature when the voltage applied to its windings is equal to the fully charged voltage of said battery at the existing ambient temperature, control means, means governed by said control means to at times connect said relay windings with said battery and at other times to disconnect said windings and to connect said load circuit to the battery, and means governed by said relay when released to cause said charging means to charge the battery at said high rate and when picked up to cause said charging means to charge the battery at said low rate.

2. In combination, a storage battery, a charging circuit for said battery including an impedance, a relay provided with a first and a second winding constantly connected across the terminals of said battery, said first winding having substantially a zero temperature coefficient of resistance, said second winding having a positive temperature coefficient of resistance and disposed so that its magnetic flux opposes the magnetic flux of said first winding, said relay adjusted to pick up only when said battery reaches that voltage at which for the existing ambient temperature it is fully charged, means for at times providing a short circuit path around a portion of said first winding for causing said relay to release, and a shunt path around said impedance including a back contact of said relay.

3. In combination, a storage battery, charging means operative to charge said battery at either a high rate or at a low rate, a load circuit, control means having a first and a second position and operative at its second position to connect said load circuit with said battery, a differential relay provided with a first winding having substantially a zero temperature coefficient of resistance and a second winding having a positive temperature coefficient of resistance, means to connect the windings of said relay across said battery in multiple and said relay proportioned to pick up when the battery voltage is equal to the voltage at which for the existing ambient temperature it is fully charged, means effective at the second position of said control means to short circuit a portion of said first winding to release said relay, and means governed by said relay when released to cause the charging means to charge the battery at said high rate and when picked up to cause the charging means to charge the battery at said low rate.

4. In combination, a storage battery, a charging circuit for charging said battery, a relay comprising a first and a second magnetic structure and an armature positioned between said magnetic structures so that the magnetic flux of said second structure opposes the picking up of the armature by the magnetic flux of said first structure, a first winding having substantially zero temperature coefficient of resistance mounted on said first magnetic structure, a second winding having a positive temperature coefficient of resistance mounted on said second magnetic structure, said windings so proportioned that when connected in multiple across said battery the armature is picked up when the battery voltage is equal to that at which for the existing ambient temperature the battery is fully charged, control means operative to at times connect said relay windings in multiple across the battery and at other times to disconnect said windings from the battery, and means governed by the relay armature to control said charging circuit.

5. In combination, a storage battery, a charging circuit for said battery including an impedance, a load circuit, a relay having a magnetic structure comprising two magnetic paths and an armature biased to an open position and disposed so that the magnetic flux of one path acts to attract the armature toward a closed position and the magnetic flux of the other path acts to retain the armature at said open position, a first winding having substantially a zero temperature coefficient of resistance mounted on said first path, a second winding having a positive temperature coefficient of resistance mounted on said second path, said windings so proportioned that said armature is attracted to its closed position when a voltage equal to that at which for the existing ambient temperature the battery is fully charged is applied to said windings in multiple, control means operative to connect said battery either with said load circuit or with said windings, and a shunt path around said impedance including a contact closed at the open position of said armature.

6. In combination, a battery, charging means effective to charge said battery at a selected rate, a relay having an armature operable to an open and to a closed position and biased to said open position, said relay having a first magnetic structure provided with a first winding having substantially zero temperature coefficient of resistance and arranged so that the magnetic flux created thereby actuates said armature to its closed position, said relay having a second magnetic structure provided with a second winding having a positive temperature coefficient of resistance and arranged so that the magnetic flux created thereby actuates said armature to its open position, means for at times connecting said first and said second windings across said battery, said first and said second windings adjusted so that said armature is operated to its closed position only when said battery reaches that voltage at which for the existing ambient temperature it is fully charged, and means governed by said armature for controlling the charging rate of said charging means.

7. In combination, a battery, charging means effective to charge said battery at a selected rate, a relay having an armature operable to an open and to a closed position, said relay being provided with a first magnetic structure and a second magnetic structure and having its armature positioned between said magnetic structures, said first structure provided with a first winding having substantially zero temperature coefficient of resistance and arranged so that the magnetic flux created thereby actuates said armature to its closed position, said second magnetic structure provided with a second winding having a positive temperature coefficient of resistance and arranged so that the magnetic flux created thereby actuates said armature to its open position, means for at times connecting said first and said second windings across said battery, said windings adjusted so that said armature is operated to its closed position only when said battery reaches that voltage at which for the existing ambient temperature it is fully charged, and means controlled by said armature for governing said charging means.

NORMAN F. AGNEW.